(12) United States Patent
Yao et al.

(10) Patent No.: US 9,182,533 B2
(45) Date of Patent: Nov. 10, 2015

(54) LIGHT GUIDE PLATE STRUCTURE AND LIGHT-GUIDE-PLATE MANUFACTURING METHOD THEREOF

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Liang-Yu Yao, Taoyuan (TW); Hsin-Cheng Ho, Taoyuan (TW); Yen-Chang Chen, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 133 days.

(21) Appl. No.: 14/066,678

(22) Filed: Oct. 29, 2013

(65) Prior Publication Data

US 2014/0133182 A1    May 15, 2014

(30) Foreign Application Priority Data

Nov. 9, 2012 (TW) .............................. 101141704 A

(51) Int. Cl.
   *G02B 6/10* (2006.01)
   *F21V 8/00* (2006.01)
   *G06F 3/02* (2006.01)
   *G06F 3/023* (2006.01)
   *H01H 13/83* (2006.01)

(52) U.S. Cl.
   CPC ............ *G02B 6/0065* (2013.01); *G06F 3/0202* (2013.01); *G06F 3/023* (2013.01); *H01H 13/83* (2013.01); *G02B 6/0036* (2013.01); *G02B 6/0055* (2013.01); *H01H 2219/044* (2013.01); *H01H 2219/06* (2013.01); *H01H 2219/062* (2013.01); *H01H 2229/002* (2013.01); *H01H 2229/012* (2013.01)

(58) Field of Classification Search
CPC ..... G02B 6/0065; G06F 3/0202; G06F 3/023; H01H 13/83
USPC ........ 362/23.03, 623; 385/129; 427/523, 553, 427/162
See application file for complete search history.

(56) References Cited

U.S. PATENT DOCUMENTS

| | | | | |
|---|---|---|---|---|
| 3,491,245 | A * | 1/1970 | Hardesty | .................. 250/227.11 |
| 7,387,423 | B2 * | 6/2008 | Leu et al. | ...................... 362/627 |
| 2011/0278145 | A1 * | 11/2011 | Takeda et al. | .................. 200/314 |

FOREIGN PATENT DOCUMENTS

WO     WO 2010070956 A1 *  6/2010

* cited by examiner

*Primary Examiner* — Jerry Blevins
(74) *Attorney, Agent, or Firm* — Winston Hsu; Scott Margo

(57) ABSTRACT

A light guide plate structure includes a light guide plate, a first medium layer, a micro structure, a second medium layer, and a reflection layer. The light guide plate has a light exit surface and a bottom surface opposite to the light exit surface. The first medium layer is formed on the light exit surface. The micro structure is formed on the bottom surface for redirecting light inside the light guide plate to emit from the light exit surface. The second medium layer is formed on the micro structure. The refractive index of the first medium layer and the refractive index of the second medium layer are less than the refractive index of the light guide plate but greater than the refractive index of air. The reflection layer is formed on the second medium layer for reflecting light inside the light guide plate to emit from the light exit surface.

14 Claims, 4 Drawing Sheets

LIGHT GUIDE PLATE STRUCTURE AND LIGHT-GUIDE-PLATE MANUFACTURING METHOD THEREOF

BACKGROUND OF THE INVENTION

1. Field of the Invention

The present invention relates to a light guide plate structure and a light-guide-plate manufacturing method thereof, and more specifically, to a light guide plate structure in which refractive indexes of medium layers respectively formed on a light exit surface and a bottom surface of a light guide plate are between a refractive index of the light guide plate and a refractive index of air and a light-guide-plate manufacturing method thereof.

2. Description of the Prior Art

Please refer to FIG. 1, which is a partial sectional diagram of a keyboard 1 in the prior art. As shown in FIG. 1, the keyboard 1 includes a bottom board 10, a plurality of keyswitches 112, and a backlight module 14. Each keyswitch 12 is disposed on the bottom board 10 for a user to perform input operations. The backlight module 14 is disposed under the bottom board 10 as a light source of the keyboard 1. The backlight module 14 includes a light shielding board 140, a light guide plate 142, a metal board 144, a reflection sheet 146, and a light emitting unit 148. The light shielding board 140 is disposed under the bottom board 10. The light guide plate 142 is disposed under the light shielding board 140. The metal board 144 is disposed under the light guide plate 142. The reflection sheet 146 is disposed on the metal board 144 and located under the light guide plate 142. The light emitting unit 148 is disposed at a side of the light guide plate 142. In such a manner, light could be evenly emitted out of the light guide plate 142 by total reflection of light occurring in the light guide plate 142 and reflection of the reflection sheet 146, and then be projected out of the keyswitches 12 after passing through the light shielding board 140 toward the bottom board 10. Accordingly, the purpose that the keyboard 1 could emit light is achieved.

In the aforesaid design, the total reflection of light could be generated by the design in which a refractive index of the light guide plate 142 is greater than a refractive index of air (i.e. 1) located between the light shielding board 140 and the light guide plate 142. However, since a surface of the light guide plate 142 is not protected appropriately, pollution of the surface of the light guide plate 142 due to attachment or scratch of foreign matter (e.g. grease or dust) may occur during the process of assembling the light guide plate 142 in the keyboard 1, so as to frustrate the total reflection of light in the light guide plate 142. Thus, it may cause the light leakage problem or reduce the travel distance of light in the light guide plate 142, so that the light use efficiency and illumination uniformity of the light guide plate 142 could be influenced. Furthermore, as shown in FIG. 1, the backlight module 14 utilizes the design in which the light guide plate 142 is disposed between the light shielding board 140 and the reflection sheet 146, to guide light to be evenly projected out of the keyswitches 12. However, since disposal of the light guide plate 142, the light shielding board 140 and the reflection sheet 146 may occupy excessive inner space of the keyboard 1, the aforesaid design is disadvantageous to the thinning design of the keyboard 1.

SUMMARY OF THE INVENTION

The present invention provides a light guide plate structure including a light guide plate, a first medium layer, a micro structure, a second medium layer, and a reflection layer. The light guide plate has a light exit surface and a bottom surface opposite to the light exit surface. The first medium layer is formed on the light exit surface. The micro structure is formed on the bottom surface for redirecting light inside the light guide plate to emit from the light exit surface. The second medium layer is formed on the micro structure. A refractive index of the first medium layer and a refractive index of the second medium layer are less than a refractive index of the light guide plate but greater than a refractive index of air. The reflection layer is formed on the second medium layer for reflecting light inside the light guide plate to emit from the light exit surface.

The present invention further provides a light-guide-plate manufacturing method. The light-guide-plate manufacturing method includes providing a light guide plate having a light exit surface and a bottom surface, forming a micro structure on the bottom surface, forming a first medium layer and a second medium layer on the light exit surface and the micro structure respectively by a surface coating process or a co-extrusion process, and forming a reflection layer on the second medium layer. A refractive index of the first medium layer and a refractive index of the second medium layer are less than a refractive index of the light guide plate but greater than a refractive index of air.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
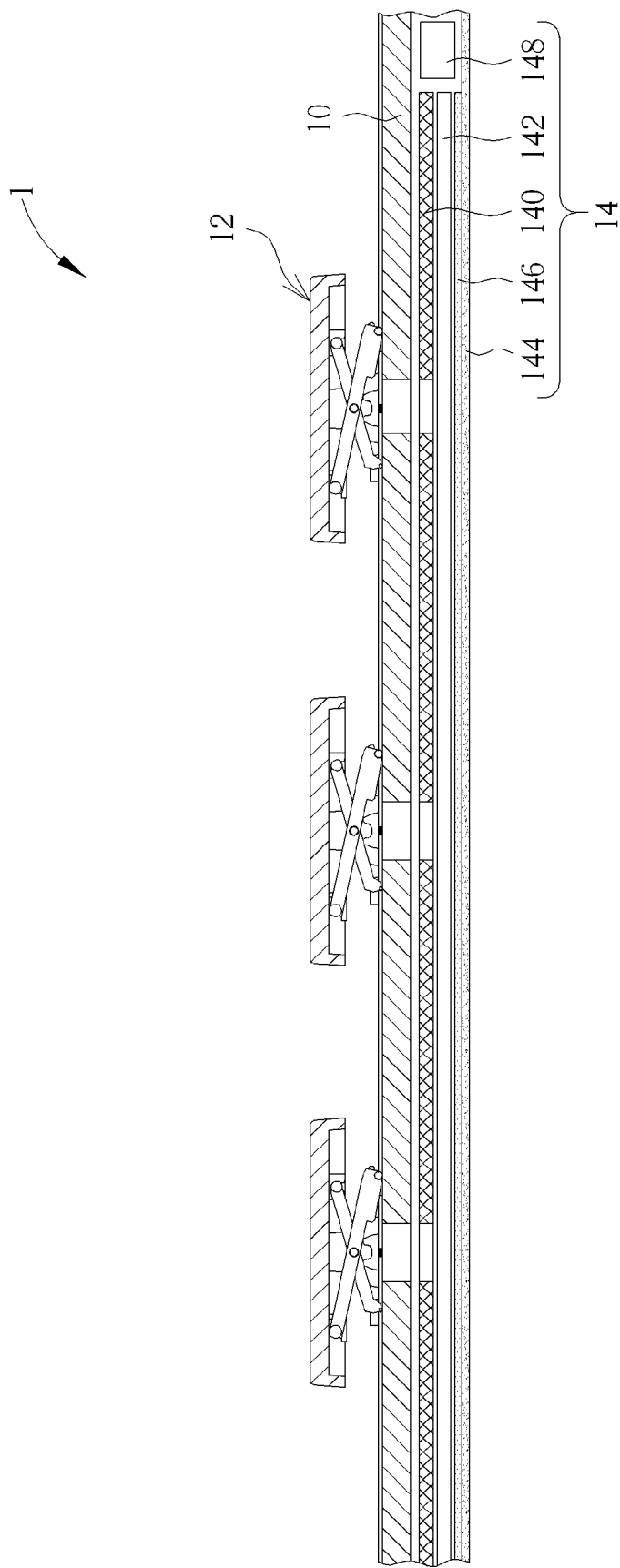
FIG. 1 is a partial sectional diagram of a keyboard in the prior art.
Figure 2:
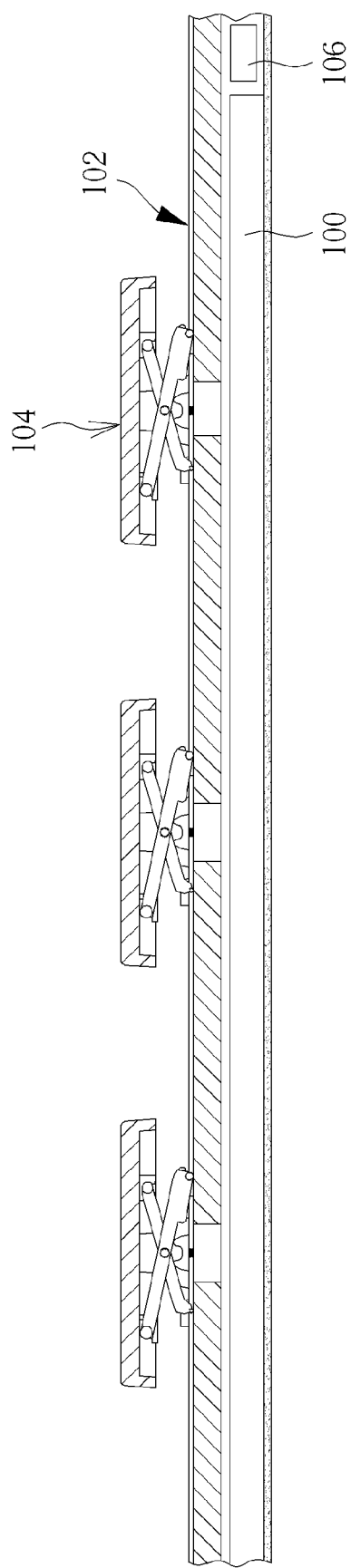
FIG. 2 is a partial sectional diagram of a light guide plate structure being disposed in a keyboard according to an embodiment of the present invention.

Please refer to FIG. 2, which is a partial sectional diagram of a light guide plate structure 100 being disposed in a keyboard 102 according to an embodiment of the present invention. As shown in FIG. 2, the light guide plate structure 100 is applied to the light emitting design of the keyboard 102, but not limited thereto. In this embodiment, the light guide plate structure 100 is disposed in the keyboard 102 corresponding to a plurality of keyswitches 104. A light emitting unit 106 (e.g. a light emitting diode) in the keyboard 102 is disposed at a side of the light guide plate structure 100, so that light emitted by the light emitting unit 106 could be projected out of the keyswitches 104 via the light guide plate structure 100 for achieving the purpose that the keyboard 102 could emit light.

Figure 3:
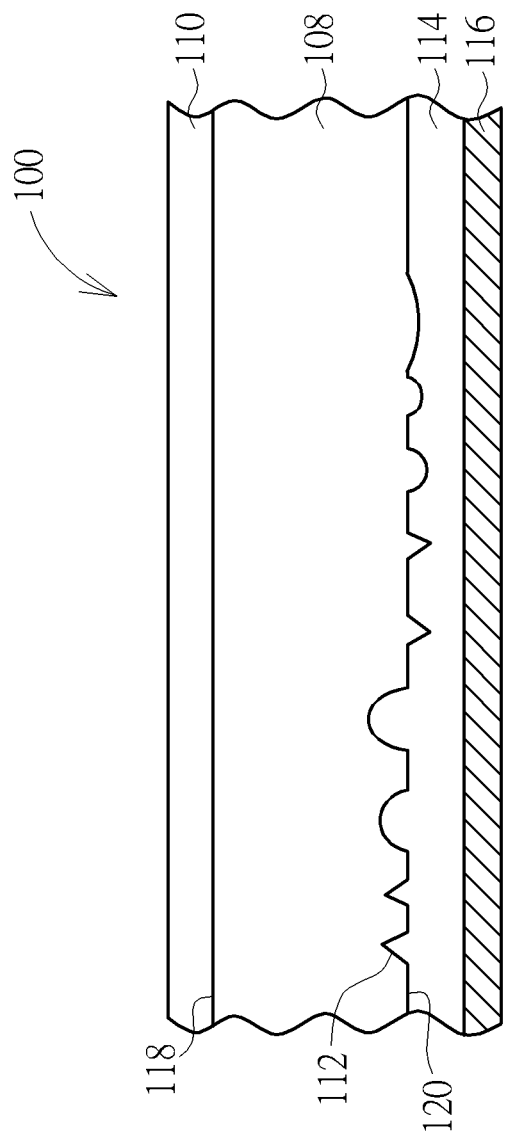
FIG. 3 is a partial enlarged diagram of the light guide plate structure in FIG. 2.
Figure 4:
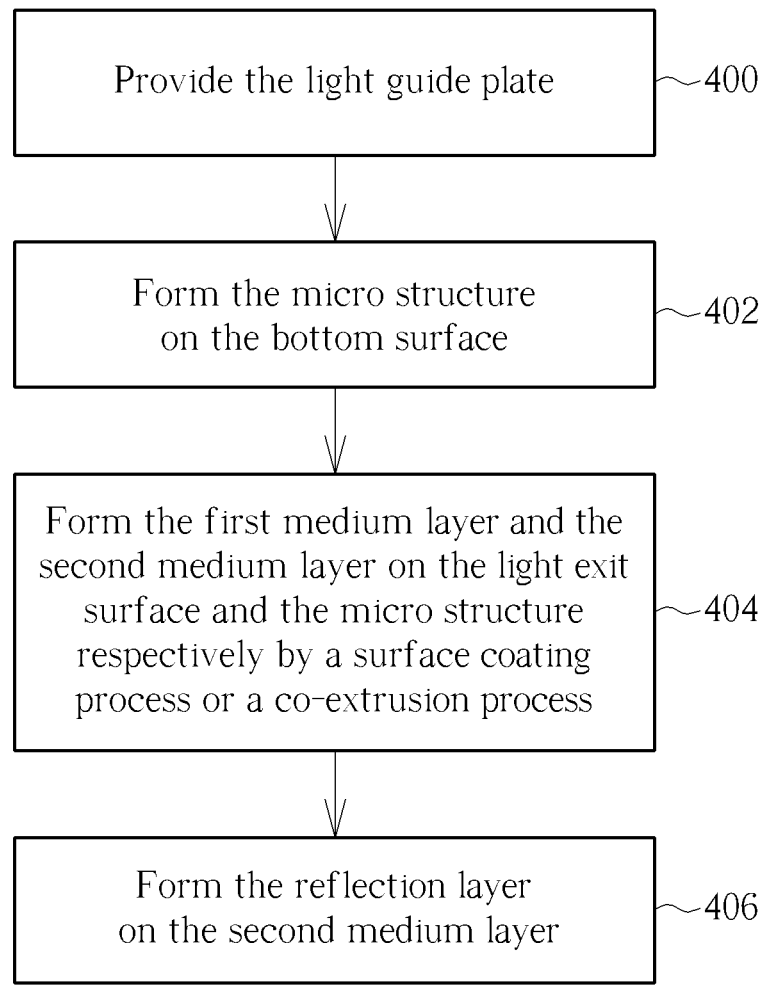
FIG. 4 is a flowchart of utilizing a light-guide-plate manufacturing method of the present invention to form the light guide plate structure in FIG. 3.

More detailed description for the structural design of the light guide plate structure 100 is provided as follows. Please refer to FIG. 3 and FIG. 4. FIG. 3 is a partial enlarged diagram of the light guide plate structure 100 in FIG. 2. FIG. 4 is a flowchart of utilizing a light-guide-plate manufacturing method of the present invention to form the light guide plate structure 100 in FIG. 3. As shown in FIG. 3, the light guide plate structure 100 includes a light guide plate 108, a first medium layer 110, a micro structure 112, a second medium layer 114, and a reflection layer 116. The micro structure 112 is briefly depicted as a concave-convex structure in FIG. 3, but not limited thereto, meaning that the micro structure 112 could adopts other micro structural design commonly seen in the prior art (e.g. an ink pattern layer). The light guide plate 108 has a light exit surface 118 and a bottom surface 120. The light exit surface 118 is opposite to the bottom surface 120. As shown in FIG. 4, the light-guide-plate manufacturing method of the present invention includes the following steps.

Step 400: Provide the light guide plate 108;

Step 402: Form the micro structure 112 on the bottom surface 120;

Step 404: Form the first medium layer 110 and the second medium layer 114 on the light exit surface 118 and the micro structure 112 respectively by a surface coating process or a co-extrusion process;

Step 406: Form the reflection layer 116 on the second medium layer 114.

As known from the aforesaid steps, the first medium layer 110 is formed on the light exit surface 118. The micro structure 112 is formed on the bottom surface 120 for scattering or diffusing light inside the light guide plate 108 to emit from the light exit surface 118. The second medium layer 114 is formed on the micro structure 112. The reflection layer 116 is formed on the second medium layer 114 for reflecting light inside the light guide plate 108 to emit from the light exit surface 118. In this embodiment, the first medium layer 110 and the second medium layer 114 are formed on the light exit surface 118 and the micro structure 112 respectively by a surface coating process or a co-extrusion process, the reflection layer 116 is formed on the second medium layer 114 by a painting process, a printing process, a stamping process, a sputtering process, or a PVD (Physical Vapor Deposition) process, and the micro structure 112 is formed on the bottom layer 120 by a hot-pressing process, an ink printing process, or an ultraviolet curing process, but not limited thereto. In other words, all forming processes for forming the first medium layer 110, the micro structure 112, the second medium layer 114 and the reflection layer on the light guide plate 108 could be adopted by the present invention. As for the related description for the aforesaid forming processes, it is commonly seen in the prior art and therefore omitted herein.

To be more specific, the present invention utilizes the design in which the refractive index of the first medium layer 110 and the refractive index of the second medium layer 114 are less than the refractive index of the light guide plate 108 but greater than the refractive index of air, to ensure that total reflection of light could occur in the light guide plate 108. For example, in this embodiment, the light guide plate 108 could be made of polycarbonate material, the refractive index of which is substantially equal to 1.5, and the first medium layer 110 and the second medium layer 114 could be made of silicon dioxide material, the refractive index of which is substantially equal to 1.2. To be noted, material of the light guide plate 108, the first medium layer 110, and the second medium layer 114 could be not limited to the aforesaid embodiment, meaning that it may vary with the practical application of the light guide plate structure 100.

In such a manner, after light is incident into the light guide plate 108 and then incident into the bottom surface 120, by reflection of the reflection sheet 116 and scattering or diffusion of the micro structure 112, light could be emitted from the light exit surface 118 and then projected out of the keyboard 102 from a position corresponding to the keyswitches 102 of the keyboard 102, so as to achieve the purpose that the keyboard 102 could emit light. During the aforesaid process, since the first medium layer 110 and the second medium layer 114, the refractive indexes of which are greater than the refractive index of air and less than the refractive index of the light guide plate 108, are formed on the light exit surface 110 and the bottom surface 120 respectively, total reflection of light could surely occur in the light guide plate 108. Accordingly, not only the travel distance of light in the light guide plate 108 could be increased, but the light transmission efficiency of the light guide plate 108 could also be improved.

Furthermore, compared with the prior art design in which the light shielding board and the reflection sheet are disposed on the upper and bottom surfaces of the light guide plate respectively, the present invention utilizes the design in which the micro structure 112 and the reflection layer 116 are directly formed on the light guide plate 108 to generate the same light-guiding effect. In such a manner, by omission of the light shielding board and the reflection sheet, the overall thickness of the light guide plate structure 100 could be effectively reduced so as to be advantageous to the thinning design of the keyboard 102.

Furthermore, via protection of the first medium layer 110, the second medium layer 114, and the reflection layer 116 as well as the separation design in which the second medium layer 114 is formed between the light guide plate 108 and the reflection layer 116, the present invention could effectively prevent the surface of the light guide plate 108 from being attached or scratched by foreign matter (e.g. grease or dust) during the process of assembling the light guide plate structure 100 in the keyboard 102, and could further prevent light from being directly absorbed by the reflection layer 116, so as to greatly improve the light use efficiency and illumination uniformity of the light guide plate structure 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guide plate structure disposed in a keyboard corresponding to keyswitches, the light guide plate structure comprising:
   a light guide plate having a light exit surface and a bottom surface opposite to the light exit surface;
   a first medium layer formed on the light exit surface;
   a micro structure formed on the bottom surface for redirecting light inside the light guide plate to emit from the light exit surface, the light guide plate being disposed under the keyswitches, and a constant interval being formed between the first medium layer and the micro structure no matter the keyswitches are pressed or not;
   a second medium layer formed on the micro structure, a refractive index of the first medium layer and a refractive index of the second medium layer being less than a refractive index of the light guide plate but greater than a refractive index of air; and
   a reflection layer formed on the second medium layer for reflecting light inside the light guide plate to emit from the light exit surface.

2. The light guide plate structure of claim 1, wherein the light guide plate is made of polycarbonate material, and the first medium layer and the second medium layer are made of silicon dioxide material.

3. The light guide plate structure of claim 1, wherein the first medium layer and the second medium layer are formed on the light exit surface and the micro structure respectively by a surface coating process or a co-extrusion process.

4. The light guide plate structure of claim 1, wherein the reflection layer is formed on the second medium layer by a painting process, a printing process, a stamping process, a sputtering process or a PVD (Physical Vapor Deposition) process.

5. The light guide plate structure of claim 1, wherein the micro structure is formed on the bottom surface by a hot-pressing process, an ink printing process, or an ultraviolet curing process.

6. A light-guide-plate manufacturing method comprising:
disposing a light guide plate having a light exit surface and a bottom surface in a keyboard and under keyswitches;
forming a micro structure on the bottom surface;
forming a first medium layer and a second medium layer on the light exit surface and the micro structure respectively by a surface coating process or a co-extrusion process, a refractive index of the first medium layer and a refractive index of the second medium layer being less than a refractive index of the light guide plate but greater than a refractive index of air, and a constant interval being formed between the first medium layer and the micro structure no matter the keyswitches are pressed or not; and
forming a reflection layer on the second medium layer.

7. The light-guide-plate manufacturing method of claim 6, wherein the light guide plate is made of polycarbonate material, and the first medium layer and the second medium layer are made of silicon dioxide material.

8. The light-guide-plate manufacturing method of claim 6, wherein the reflection layer is formed on the second medium layer by a painting process, a printing process, a stamping process, a sputtering process or a PVD (Physical Vapor Deposition) process.

9. The light-guide-plate manufacturing method of claim 6, wherein the micro structure is formed on the bottom surface by a hot-pressing process, an ink printing process, or an ultraviolet curing process.

10. A backlight keyboard comprising:
a substrate;
a plurality of keyswitches disposed on the substrate; and
a light guide plate structure disposed under the substrate corresponding to the keyswitches, the light guide plate structure comprising:
a light guide plate having a light exit surface and a bottom surface opposite to the light exit surface;
a first medium layer formed on the light exit surface;
a micro structure formed on the bottom surface for redirecting light inside the light guide plate to emit from the light exit surface, and a constant interval being formed between the first medium layer and the micro structure no matter the keyswitches are pressed or not;
a second medium layer formed on the micro structure, a refractive index of the first medium layer and a refractive index of the second medium layer being less than a refractive index of the light guide plate but greater than a refractive index of air; and
a reflection layer formed on the second medium layer for reflecting light inside the light guide plate to emit from the light exit surface.

11. The backlight keyboard of claim 10, wherein the light guide plate is made of polycarbonate material, and the first medium layer and the second medium layer are made of silicon dioxide material.

12. The backlight keyboard of claim 10, wherein the first medium layer and the second medium layer are formed on the light exit surface and the micro structure respectively by a surface coating process or a co-extrusion process.

13. The backlight keyboard of claim 10, wherein the reflection layer is formed on the second medium layer by a painting process, a printing process, a stamping process, a sputtering process or a PVD (Physical Vapor Deposition) process.

14. The backlight keyboard of claim 10, wherein the micro structure is formed on the bottom surface by a hot-pressing process, an ink printing process, or an ultraviolet curing process.

* * * * *